United States Patent
Ishigami et al.

(10) Patent No.: US 8,269,866 B2
(45) Date of Patent: Sep. 18, 2012

(54) IMAGE PROCESSING APPARATUS, METHOD, PROGRAM AND IMAGE PICKUP APPARATUS

(75) Inventors: Koichiro Ishigami, Kanagawa (JP); Hideho Une, Tokyo (JP); Yumi Sanaka, Kanagawa (JP); Naoya Katoh, Chiba (JP)

(73) Assignee: Sony Corporation (JP)

( * ) Notice: Subject to any disclaimer, the term of this patent is extended or adjusted under 35 U.S.C. 154(b) by 79 days.

(21) Appl. No.: 12/807,840

(22) Filed: Sep. 15, 2010

(65) Prior Publication Data
US 2011/0007181 A1 Jan. 13, 2011

Related U.S. Application Data

(62) Division of application No. 11/434,476, filed on May 15, 2006.

(30) Foreign Application Priority Data

May 16, 2005 (JP) ................................. 2005-142252

(51) Int. Cl.
*H04N 9/73* (2006.01)
(52) U.S. Cl. ...................................................... 348/272
(58) Field of Classification Search .................. 348/655, 348/656, 650, 645, 223.1, 224.1, 366
See application file for complete search history.

(56) References Cited

U.S. PATENT DOCUMENTS

| | | | |
|---|---|---|---|
| 5,146,323 A | 9/1992 | Kobori et al. | |
| 5,329,361 A | 7/1994 | Matsui et al. | |
| 5,452,019 A | 9/1995 | Fukuda et al. | |
| 5,563,654 A | 10/1996 | Song | |
| 6,594,388 B1 * | 7/2003 | Gindele et al. | 382/167 |
| 6,727,942 B1 * | 4/2004 | Miyano | 348/223.1 |
| 6,952,225 B1 * | 10/2005 | Hyodo et al. | 348/223.1 |
| 7,006,135 B2 * | 2/2006 | Ishimaru et al. | 348/223.1 |
| 7,148,922 B2 * | 12/2006 | Shimada | 348/224.1 |
| 7,489,345 B2 | 2/2009 | Fukumoto | |
| 7,800,697 B2 * | 9/2010 | Ishigami et al. | 348/655 |
| 8,085,323 B2 * | 12/2011 | Tanaka et al. | 348/254 |

FOREIGN PATENT DOCUMENTS

| | | |
|---|---|---|
| EP | 0 658 058 | 6/1995 |
| JP | 07-123435 | 5/1995 |
| JP | 2002-281512 | 9/2002 |
| JP | 2003-259392 | 9/2003 |

* cited by examiner

*Primary Examiner* — Paulos Natnael
(74) *Attorney, Agent, or Firm* — Lerner, David, Littenberg, Krumholz & Mentlik, LLP

(57) ABSTRACT

An amplifier gain setting section estimates a light source parameter which relies upon a spectral distribution of an image pickup light source based on an image signal. Then, a first adjustment control value for each color signal when adjustment is to be performed so as to establish a white balance based on the estimated parameter is modulated by an amount corresponding to a follow-up sensitivity toward a second adjustment control value when adjustment is to be performed so that an achromatic subject under a particular reference light source is reproduced as an achromatic subject. The modulated adjustment control value is set to a white balance amplifier. The follow-up sensitivity is set to the amplifier gain setting section in response to an illuminance level estimated from a detection value of the brightness.

5 Claims, 6 Drawing Sheets

REFERENCE CHART : 1000 Lux

IRIS : F2.0
ELECTRONIC SHUTTER : 1/60 sec

DETECTION VALUE : 100

IRIS : F4.0
ELECTRONIC SHUTTER : 1/120 sec

DETECTION VALUE : 50

IMAGE PROCESSING APPARATUS, METHOD, PROGRAM AND IMAGE PICKUP APPARATUS

CROSS-REFERENCE TO RELATED APPLICATIONS

This application is a divisional of U.S. application Ser. No. 11/434,476 filed on May 15, 2006, which claims priority from Japanese Patent Application No. JP 2005-142252 filed on May 16, 2005 in the Japanese Patent Office, the disclosures of which are hereby incorporated by reference herein.

BACKGROUND OF THE INVENTION

This invention relates to an image processing apparatus which processes a color image signal, an image processing method, an image processing program thereof and an image pickup apparatus which has a function of processing a color image signal, and more particularly an image processing apparatus, an image processing method, an image processing program and an image pickup apparatus for controlling the adjustment of color signals so as to optimize the color reproduction.

Image pickup apparatus such as a digital still camera and a digital video camera in which a solid-state image pickup element is used frequently have an automatic white balance function. One of such solid-state image pickup apparatus is disclosed in Japanese Patent Laid-Open No. 2002-281512. The automatic white balance function adjusts the color so that a white subject is displayed as a white picture irrespective of the color of the light source upon image pickup.

However, even if a white subject is reproduced as an image of a precise white picture, this does not necessarily mean that an appearance of the white subject to a human being in an image pickup scene is reproduced naturally. For example, a rather reddish white under an incandescent lamp or a rather bluish white in the shade outdoors is sometimes sensed natural. One of reasons of this is that an adaptation mechanism of the visual sense of a human being has a characteristic that it does not always follow up the white in the visual field. Further, also it makes one of the causes that, when a user picks up an image, the intention, liking, and so forth of the user are different such as whether the user wants to have an atmosphere of a scene of a view left or wants to have accurate information of a subject as an article left. Furthermore, not only with regard to the white balance but also with regard to a color other than the white, reproduction of a subject such that it is similar in colorimetry to that under a particular light source does not necessarily result in natural reproduction of the subject in an appearance intended by the user upon image pickup.

In the automatic white balance function, for example, a variation in color by a light source is estimated from an image signal of a result of image pickup, and the estimated color is followed up automatically. In such control as just described, for example, a color temperature range or the like for decision of a light source is frequently set in an image pickup apparatus in advance. If the color temperature range is great, then a resulting picture does not have an atmosphere of the light source left very much therein although it reproduces the color of the subject in fidelity. However, if the color temperature range is small, then a resulting picture does not exhibit a correct color of the subject although it has an atmosphere of the light source left therein.

Meanwhile, an image pickup apparatus which includes a mechanism for intentionally displacing the white balance is conventionally available. Such empirical perception is conventionally known that, for example, under an artificial light source such as an incandescent lamp in a room, where an image is rather reddish, an achromatic color or a color of the skin is reproduced naturally. Thus, such a countermeasure is conventionally available that an offset process for leaving a tinge of red or a process of suppressing the R (Red) gain of the white balance is performed upon follow-up on the low color temperature side. Also another countermeasure is available which allows a user to set a range of movement of the white balance amplifier gain.

In such intentional displacement of the adjustment value by an automatic white balance process as in the techniques described above, efforts have been made to change over the way of displacement of the adjustment value based on fixed circumstantial judgment. However, it is difficult to unconditionally decide a condition which can be regarded appropriate in any situation. Particularly in order to prevent such a burden from being imposed on a user that the user designates a follow-up condition of the white balance, adaptive control to a scene for image pickup is required. To this end, for example, it is a possible countermeasure to classify a color temperature level or a brightness level of a scene based on a relationship in magnitude to a threshold value set in advance and change over the follow-up method depending upon the classification. However, the countermeasure cannot always achieve an optimum state.

It is desirable to provide an image processing apparatus which can automatically produce an image which exhibits a natural white balance state in which the image appears in a color proximate to that which looks to an observer in an image pickup scene.

It is also desirable to provide an image pickup apparatus which can automatically produce an image which exhibits a natural white balance state in which the image appears in a color proximate to that which looks to an observer in an image pickup scene.

SUMMARY OF THE INVENTION

In order to satisfy the needs described above, according to the present invention, there is provided an image processing apparatus for processing a color image signal, including light source color estimation means for estimating a light source parameter which relies upon a spectral distribution of an image pickup light source based on the color image signal; illuminance level estimation means for estimating an illuminance level whose value relies upon an illuminance based on the color image signal; control value modulation means for modulating a first adjustment control value for each color signal of the color image signal when adjustment is to be performed so as to establish a white balance based on the estimated light source parameter in a direction toward a second adjustment control value for each of the color signals when adjustment is to be performed so that an achromatic subject under a particular reference light source is reproduced as an achromatic subject; and modulation control means for varying an amount of modulation of the first adjustment control value in response to the illuminance level.

In the image processing apparatus, the light source color estimation means estimates a light source parameter which relies upon a spectral distribution of an image pickup light source based on a color image signal, and the control value modulation means modulates a first adjustment control value for each color signal of the color image signal when adjustment is to be performed so as to establish a white balance based on the estimated light source parameter in a direction toward a second adjustment control value for each of the color signals when adjustment is to be performed so that an achromatic subject under a particular reference light source is reproduced as an achromatic subject. The modulation control means varies the modulation amount of the first adjustment control value in response to an illuminance level estimated by the illuminance level estimation means and having a value which relies upon an illuminance. Consequently, a degree by which a tinge of the image pickup light source is left is controlled in response to the illuminance level. As a result, the image signal can be adjusted automatically so that the image to be reproduced has a natural tone proximate to that of an adaptation state of a human being to a color.

The above and other objects, features and advantages of the present invention will become apparent from the following description and the appended claims, taken in conjunction with the accompanying drawings in which like parts or elements denoted by like reference symbols.

DETAILED DESCRIPTION

A preferred embodiment of the present invention wherein the present invention is applied to a digital still camera is described in detail below.

Figure 1:
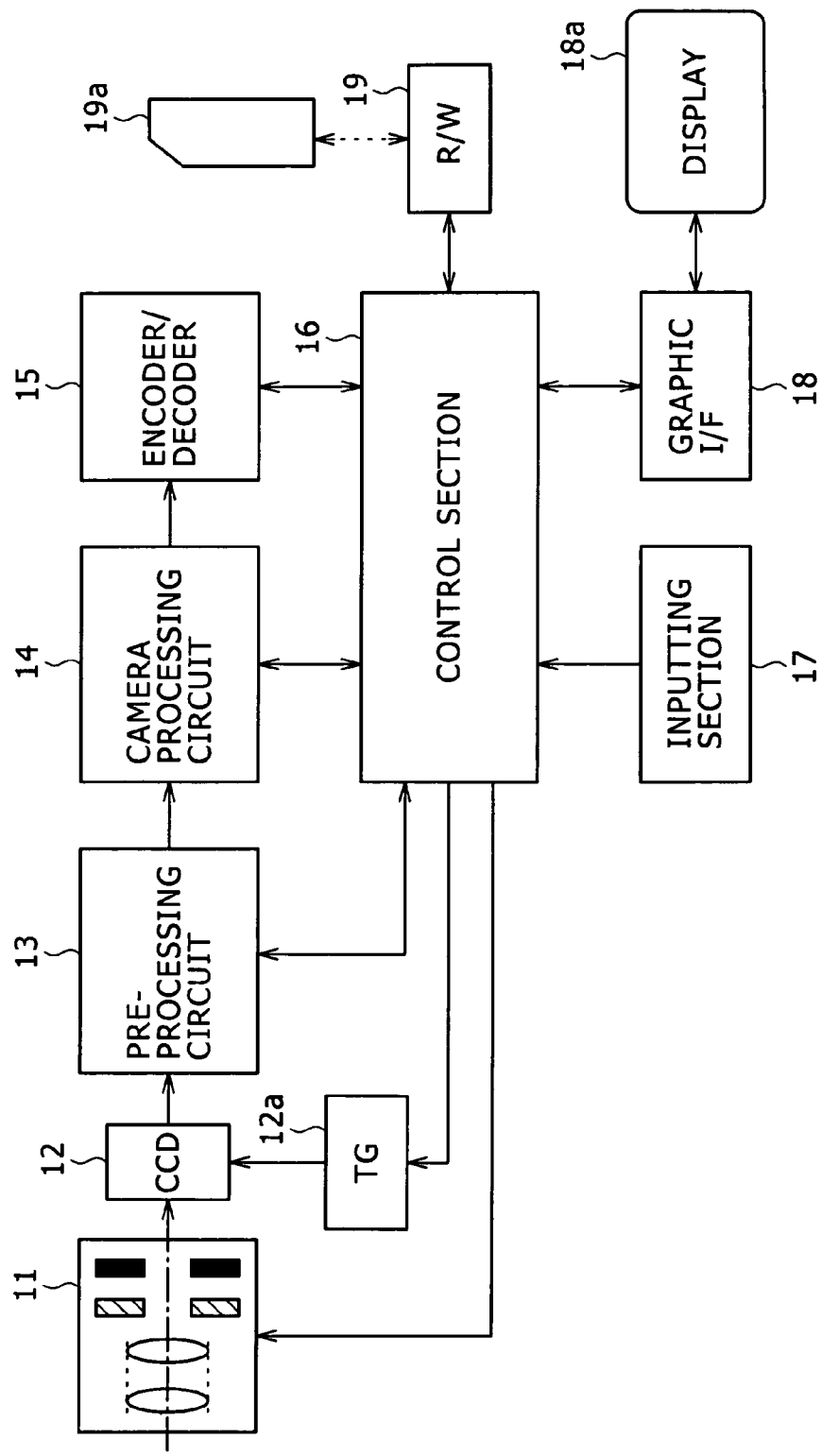
FIG. 1 is a block diagram showing a general configuration of a digital still camera to which the present invention is applied.

FIG. 1 shows a general configuration of the digital still camera according to the embodiment of the present invention. Referring to FIG. 1, the digital still camera shown includes an optical block 11, a CCD unit 12, a timing generator (TG) 12a, a pre-processing circuit 13, a camera processing circuit 14, an encoder/decoder 15, a control section 16, an inputting section 17, a graphic interface (I/F) 18, a display unit 18a, a reader/writer (R/W) 19, and a memory card 19a. The optical block 11, timing generator 12a, pre-processing circuit 13, camera processing circuit 14, encoder/decoder 15, inputting section 17, graphic interface 18 and reader/writer 19 are connected to the control section 16.

The optical block 11 includes a lens for condensing light from a subject on the CCD unit 12, a driving mechanism for moving the lens to perform focusing or zooming, a shutter mechanism, an iris mechanism and so forth. The lens and the mechanisms are driven based on control signals from the control section 16.

The CCD unit 12 is driven based on a timing signal outputted from the timing generator 12a, and converts incoming light from a subject into an electric signal. It is to be noted that some other solid-state image pickup device such as a CMOS (Complementary Metal Oxide Semiconductor) image sensor may be used in place of the CCD unit 12. The timing generator 12a outputs the timing signal under the control of the control section 16.

The pre-processing circuit 13 performs a sample hold process for an image signal outputted from the CCD unit 12 so that an S/N (Signal/Noise) ratio is kept good through a CDS (Correlated Double Sampling) process. Further, the pre-processing circuit 13 controls the gain through an AGC (Auto Gain Control) process, and performs an A/D conversion process and outputs a digital image signal.

The camera processing circuit 14 performs camera signal processes such as a white balance adjustment process, a color correction process, an AF (Auto Focus) process, an AE (Auto Exposure) process and so forth for the image signal from the pre-processing circuit 13.

The encoder/decoder 15 performs a compression encoding process for the image signal from the camera processing circuit 14 in a predetermined still picture image data format such as a JPEG (Joint Photographic Coding Experts Group) system or the like. Further, the encoder/decoder 15 performs a decompression decoding process for encoded data of a still picture image supplied from the control section 16.

The control section 16 is a microcontroller formed, for example, from a CPU (Central Processing Unit), a ROM (Read Only Memory), a RAM (Random Access Memory) and so forth, and executes a program stored in the ROM and so forth so that the components of the digital still camera are controlled generally.

The inputting section 17 is formed from various operation keys such as, for example, a shutter release button and so forth, a lever and a dial, and outputs a control signal to the control section 16 in response to inputting operation by the user.

The graphic interface 18 produces an image signal to be displayed on the display unit 18a from the image signal supplied thereto from the control section 16, and supplies the image signal to the display unit 18a so as to be displayed on the display unit 18a. The display unit 18a is formed, for example, from an LCD (Liquid Crystal Display) unit and displays a camera-through-image during image pickup, an image produced by reproducing data recorded on the memory card 19a and so forth.

The memory card 19a which is formed from a portable type flash memory is removably connected as a recording medium for recording image data produced by image pickup and so forth to the reader/writer 19. The reader/writer 19 writes data supplied from the control section 16 on the memory card 19a, and outputs data read out from the memory card 19a to the control section 16. It is to be noted that, for example, a writable optical disk, a hard disk drive (HDD) or the like may be used as a recording medium.

Here, basic operation of the digital still camera is described. First, operation upon image pickup of a still picture image is described.

Before a still picture image is picked up, a signal obtained through upon reception of light and execution of an electro-optic conversion process by the CCD unit 12 is successively supplied to the pre-processing circuit 13. The pre-processing circuit 13 performs a CDS process and an AGC process for the inputted signal and converts the processed signal into a digital signal. The camera processing circuit performs a picture quality correction process for the digital image signal supplied thereto from the pre-processing circuit 13 and supplies the processed signal as a signal of a camera-through-image to the graphic interface 18 through the control section 16. Consequently, the camera-through-image is displayed on the display unit 18a, and the user can perform adjustment of the angle of view while looking at the image displayed on the display unit 18a.

Then, if the shutter release button of the inputting section 17 is depressed in the state just described, then the control section 16 outputs a control signal to the optical block 11 and the timing generator 12a to cause the shutter of the optical block 11 to operate. Consequently, an image signal for one frame is outputted from the CCD unit 12.

The camera processing circuit 14 performs an image quality correction process for the image signal for one frame supplied from the CCD unit 12 through the pre-processing circuit 13 and supplies the resulting image signal to the encoder/decoder 15. The encoder/decoder 15 performs a compression encoding process for the inputted image signal and supplies thus produced encoded data to the reader/writer 19 through the control section 16. Consequently, a data file of the picked up still picture image is stored into the memory card 19a.

On the other hand, where a still picture image file stored in the memory card 19a is to be reproduced, the control section 16 reads out a selected still picture image file from the memory card 19a through the reader/writer 19 in response to an input of operation from the inputting section 17 and supplies the read out file to the encoder/decoder 15 to cause the encoder/decoder 15 to execute a decompression decoding process. The decoded image signal is supplied to the graphic interface 18 through the control section 16. Consequently, a still picture image is reproduced and displayed on the display unit 18a.

Figure 2:
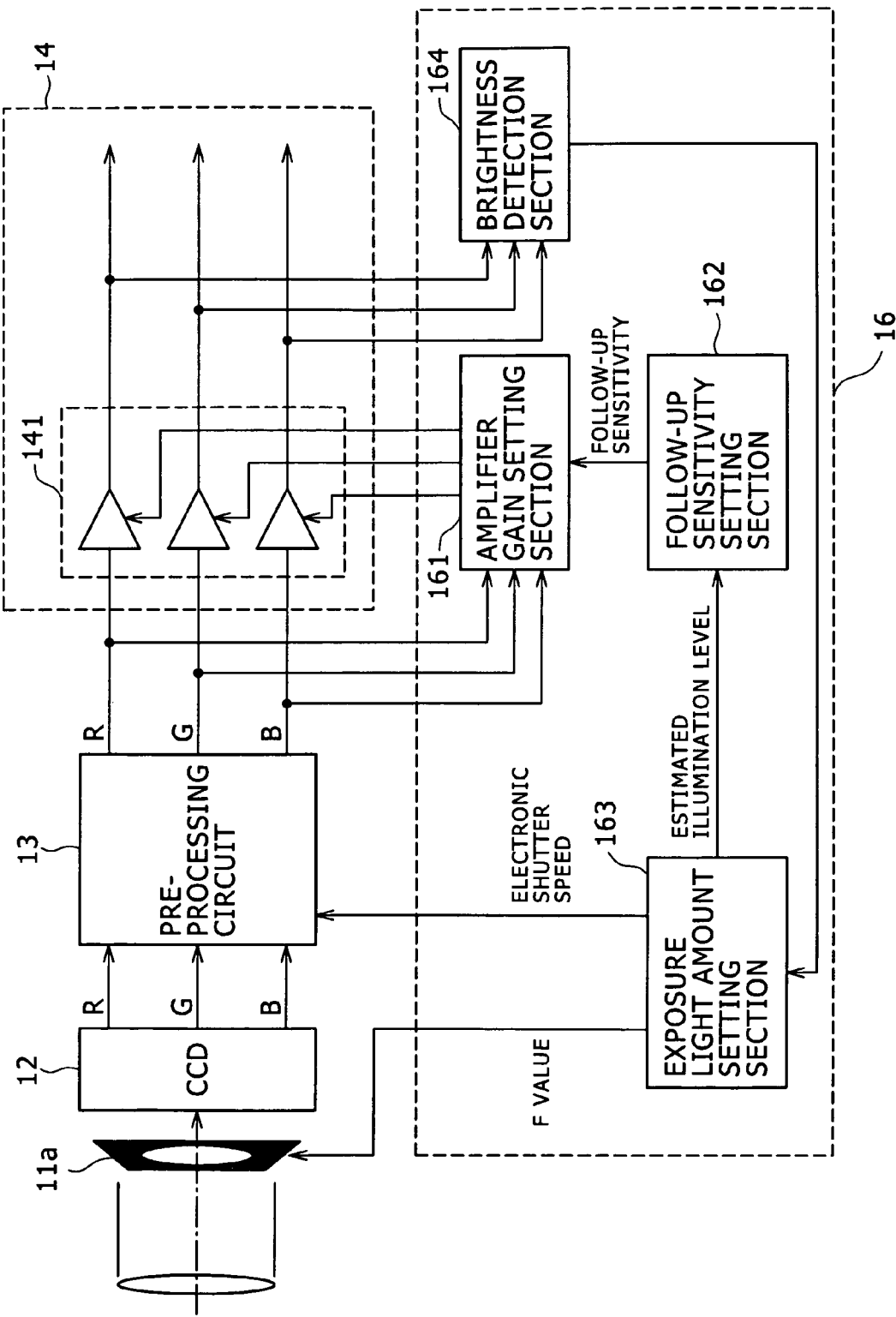
FIG. 2 is a functional block diagram showing a functional configuration for implementing a white balance adjustment process of the digital still camera of FIG. 1.

Now, a white balance adjustment process of the camera processing circuit 14 is described. FIG. 2 shows a functional configuration for implementing the white balance adjustment process.

Referring to FIG. 2, the camera processing circuit of the digital still camera according to the present embodiment includes a white balance (WB) amplifier 141. Meanwhile, the control section 16 includes an amplifier gain setting section 161, a follow-up sensitivity setting section 162, an exposure light amount setting section 163 and a brightness detection section 164. It is to be noted that the functions of the control section 16 are implemented, for example, by software processing.

RGB signals digitalized by the pre-processing circuit 13 are inputted to the white balance amplifier 141 and the amplifier gain setting section 161. The white balance amplifier 141 includes gain control amplifiers for white balance adjustment which individually vary the levels of the RGB signals and have gains set therein in accordance with a control signal from the amplifier gain setting section 161.

The amplifier gain setting section 161 calculates amplifier gain control values based on an image signal from the pre-processing circuit 13 and a follow-up sensitivity set by the follow-up sensitivity setting section 162. The gain controlling function here includes not only a function of setting a signal of an achromatic subject in an image to a state of R=G=B but also a function of modulating the control values in response to the follow-up sensitivity from the state of R=G=B.

The amplifier gain setting section 161 includes an internal ROM in which data of a block body focus which makes a reference upon adjustment of the gains of the amplifiers for R, G and B of the white balance amplifier 141 are stored. The gain adjustment function parallelly moves a ratio of R, G and B calculated based on the image signal in a direction toward a predetermined chromaticity along the black body locus on a chromaticity coordinate system which is formed from the RGB ratio. At this time, the amount of movement from the original ratio to the predetermined ratio is varied in response to the follow-up sensitivity set by the follow-up sensitivity setting section 162 thereby to vary the degree by which a color tone of an image pickup light source to be adjusted by the white balance amplifier 141 is left on an image.

It is to be noted that the black body locus is a representation of a manner of variation of the color of light emitted from a virtual article called full radiator (black body) which fully absorbs energy as the temperature rises as a locus of the variation of the color temperature on a chromaticity coordinate system. According to the black body locus, the black body emits light of a highly reddish color while the color temperature is low, and the color of the light exhibits such a variation as to yellow, white and bluish white as the color temperature rises. The color of ordinary light sources (sunlight, an incandescent lamp and so forth) exists in the proximity of the black body locus. Meanwhile, the light of such a light source as a fluorescent lamp in which fluorescent substance is excited to generate visible rays is sometimes spaced away from the black body locus when it is sensed by an image sensor. However, according to the sense of the eyes of a human being, such a light source as mentioned just above is proximate to a light source on the black body locus, and therefore, when a tinge of red or blue of an image by a light source is to be corrected, a natural color image is obtained by parallel movement of the RGB ratio along the black body locus.

The follow-up sensitivity setting section 162 sets a follow-up sensitivity to the amplifier gain setting section 161 in response to an output value of the exposure light amount setting section 163. The exposure light amount setting section 163 is a block which takes charge of an AE function and automatically sets an exposure light amount based on a detection value of the brightness detection section 164. In particular, the exposure light amount setting section 163 outputs a control value (F value) for the opening of an iris 11a, a control value for the electronic shutter speed of the pre-processing circuit 13 and so forth. Further, the exposure light amount setting section 163 calculates a level (called estimated illuminance level) which relies upon an absolute illuminance based on the detection value of the brightness and outputs the estimated illuminance level to the follow-up sensitivity setting section 162. The brightness detection section 164 detects the brightness from RGB signals outputted from the white balance amplifier 141. As hereinafter described, the brightness detection section 164 detects an average value of maximum values of RGB values of the pixels over the overall screen and outputs the average value as information of the brightness.

Now, gain setting of the white balance amplifier 141 is described.

If the white balance gain is adjusted so that a tinge of an image pickup light source may not remain, then since an image after the adjustment does not always reproduce an appearance intended by the user, the amplifier gain setting section 161 intentionally displaces the gain control value to an appropriate state.

One of possible countermeasures for performing appropriate control is a method of applying an adaptation mechanism of vision, whose investigation has proceeded in recent years, to assume a process of calculating a color natural to the visual sense from a situation of an image pickup scene using a model expression to implement continuous and natural control. For example, according to a CIECAM02 model which is a model of appearance of a color (Color Appearance Model) defined for color management by the CIE (The International Commission on Illumination), a D factor which represents the degree of adaptation to a white point can be calculated from an absolute luminance of white, a relationship in luminance between a viewing object and the surroundings in the observation circumstance, and so forth. The adaptation degree here represents an adaptation gain variation with regard to a response (L, M, S) of a pyramid which is independent among different channels, and a proximate effect can be anticipated even if the adaptation degree is applied to control of the white balance gain which is independent among the R, G and B channels which are a response of an image sensor.

However, the definition of the luminance when an adaptation situation of an observer is specified in a model expression of a CIECAM02 model and so forth is assumed with reference to the luminance of light reflected by a virtual white surface such as a fully diffusing reflecting surface. However, in practical use, it conforms to an intention of the model to convert an illuminance level into a luminance with which light from a light source is reflected by a virtual surface having a fixed reflectivity rather than to directly use the luminance level of an unspecified surface in a scene. Particularly, in an image pickup scene, the luminance information is unstabilized by a variation of the subject or the angle of view upon image pickup, and the magnitude of the reflectivity of the subject cannot be distinguished from the intensity of the light source. Therefore, the definition of the luminance described above is not suitable to stably estimate the degree of the adaptation state.

Therefore, in the present embodiment, a level (estimated illuminance level) which relies upon the illuminance is estimated based on a result of detection of the brightness, and the follow-up sensitivity is varied in response to the estimated level to vary the amount of movement of the control value for the amplifier gain thereby to automatically correct the image signal so that a natural color which matches with the application state of the visual sense of the human being may be obtained.

In the following, setting of an amplifier gain is described particularly. It is to be noted that, while the amplifier gain of the white balance amplifier 141 can be adjusted individually for all of R, G and B, the following description of the present embodiment is given taking a case wherein only the two amplifier gains for R and B are adjusted while the gain for the G amplifier is fixed as an example. Further, in the following description, the terms R ratio and B ratio represent ratios between channels, that is, R/G and B/G, calculated based on results of integration of the values of the R, G and B channels after the pre-processing circuit 13 over the overall screen.

Figure 3:
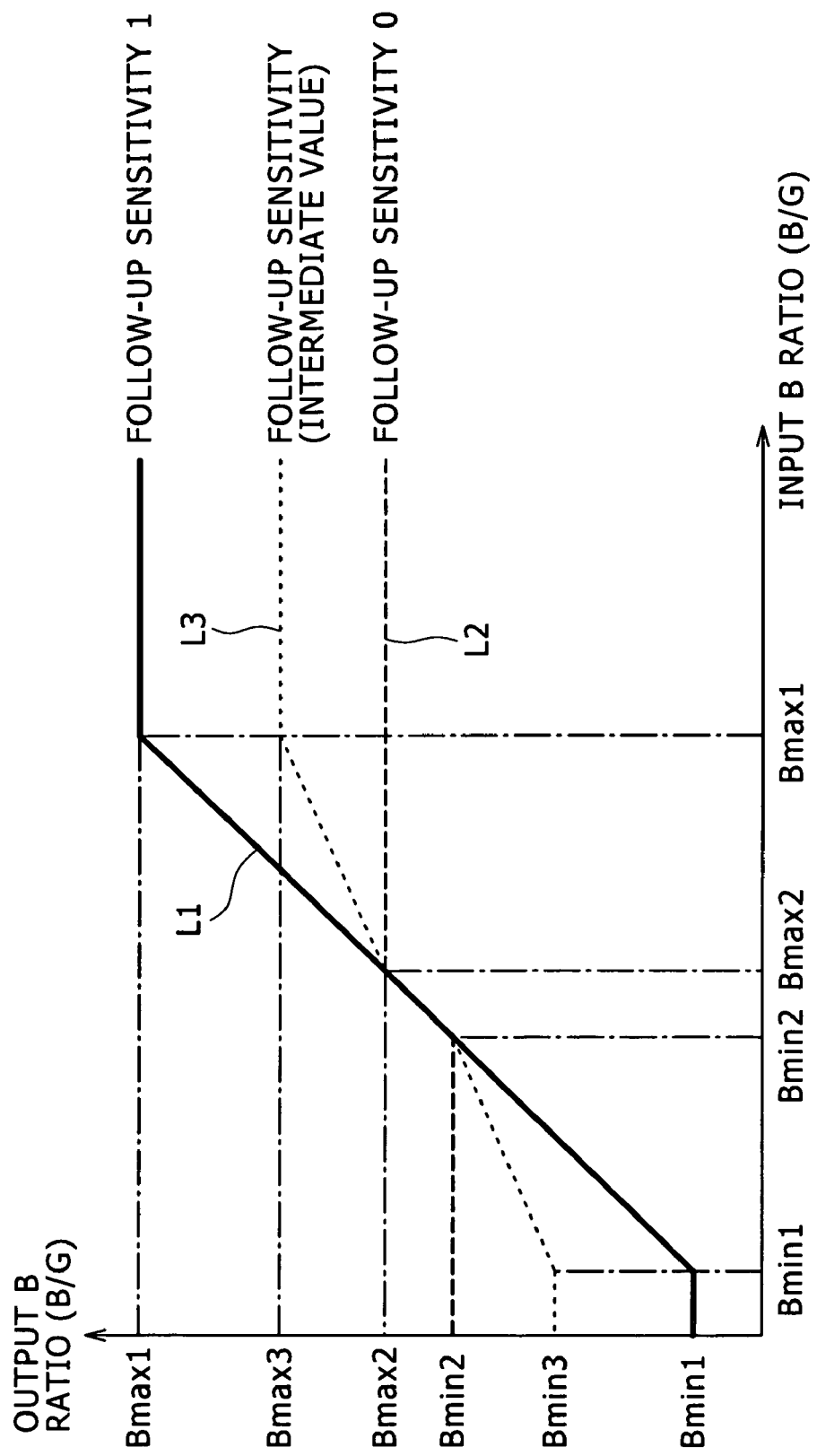
FIG. 3 is a diagram illustrating setting of the follow-up sensitivity of a B ratio of an amplifier gain setting section shown in FIG. 2.

FIG. 3 illustrates setting of the follow-up sensitivity of the B ratio of the amplifier gain setting section 161 as an example.

The "input B ratio" of the axis of abscissa in FIG. 3 indicates the B ratio calculated by an AWB function, and it is indicated that the input B ratio is modulated in accordance with a straight line in the graph of FIG. 3. The follow-up sensitivity to be set by the follow-up sensitivity setting section 162 assumes a value within a range from zero to one, and where the follow-up sensitivity is 1, the input B ratio is outputted as it is as seen from a line L1 indicated by a thick line in FIG. 3 and is adjusted so that the output B ratio fully follows up the input B ratio so as to reproduce correct white. However, where the input B gain is lower than a lower limit value Bmin1 or higher than an upper limit value Bmax1, the output B gain is fixed to the fixed lower limit value Bmin1 or the fixed upper limit value Bmax1 to restrict the output B gain. Such limit values are provided, for example, corresponding to a range of the color temperature available with a general light source.

Where the follow-up sensitivity is 0, basically a fixed value is outputted as the output B ratio irrespective of the input B ratio as seen from a line L2 represented as a broken line. However, a range is provided within which the output B ratio fully follows up the input B gain so as to reproduce correct white such that, where the input B ratio has a value between a lower limit value Bmin2 and an upper limit value Bmax2 provided therefor, the input ratio is outputted as it is, but where the input B ratio is lower than the lower limit value Bmin2, the output B ratio is fixed to the lower limit value Bmin2 whereas, where the input B ratio is higher than the upper limit value Bmax2, the output B ratio is fixed to the upper limit value Bmax2.

Where the follow-up sensitivity is set to a value between zero and one, if the input B gain has a value within the lower limit value Bmin2 and the upper limit value Bmax2, the input B gain is outputted as it is so that the output B gain fully follows up the input B gain so as to reproduce correct white as indicated by a line L3 represented as a dotted line. On the other hand, if the input B ratio has a value between the lower limit value Bmin1 and the lower limit value Bmin2 or between the upper limit value Bmax2 and the upper limit value Bmax1, then a value obtained by linear conversion of the input B ratio with a straight line having a gradient (0 to 1) corresponding to the follow-up sensitivity is used as the output B ratio. Further, if the input B ratio has a value lower than the lower limit value Bmin1 or higher than the upper limit value Bmax1, then the output B ratio is fixed to a lower limit value Bmin3 or an upper limit value Bmax3. In other words, outside the range within which the output B ratio follows up fully (range between Bmin2 and Bmax2), the B ratio is adjusted so that the white point is displaced by a greater distance as the follow-up sensitivity decreases.

In the gain adjustment process described above, the lower limit value Bmin2 and the upper limit value Bmax2 of the range (hereinafter referred to as follow-up range) within which the gain control fully follows up so as to reproduce correct white are regarded as gain values (here, B ratios) with which, where two reference light sources corresponding to the limit values are assumed, correct white is reproduced under the respective reference light sources. In other words, it is considered that, when the B ratio is not within the follow-up range, the B ratio is set to that one of gain values under an arbitrary one of the reference light sources which is nearer to the value at present to displace the white point so that a tinge of the image pickup light source may remain naturally.

On the other hand, also it can be considered that the gain value (B ratio) where one reference light source is assumed is positioned at an intermediate position between the lower limit value Bmin2 and the upper limit value Bmax2 and the B ratio within a fixed range in the proximity of the intermediate value is not varied. Where this is considered, it can be recognized that the effect of reproducing a natural picture is provided even if the follow-up range described above is not provided (that is, the limit values are set to Bmin2=Bmax2).

It is to be noted that the lower limit values Bmin1 and Bmin2 and the upper limit values Bmax1 and Bmax2 mentioned hereinabove may have values set in advance or may be set arbitrarily by the user. For example, the set values may be changed depending upon whether still picture image pickup or moving picture image pickup is to be performed. Further, the reference light source preferably is uniform energy light whose spectral distribution has energy uniform within a wavelength region of visible rays. Or, the reference light source preferably has a chromaticity proximate to a daylight locus whose color temperature is within a range from 5,000 [K] to 7,000 [K].

Figure 4:
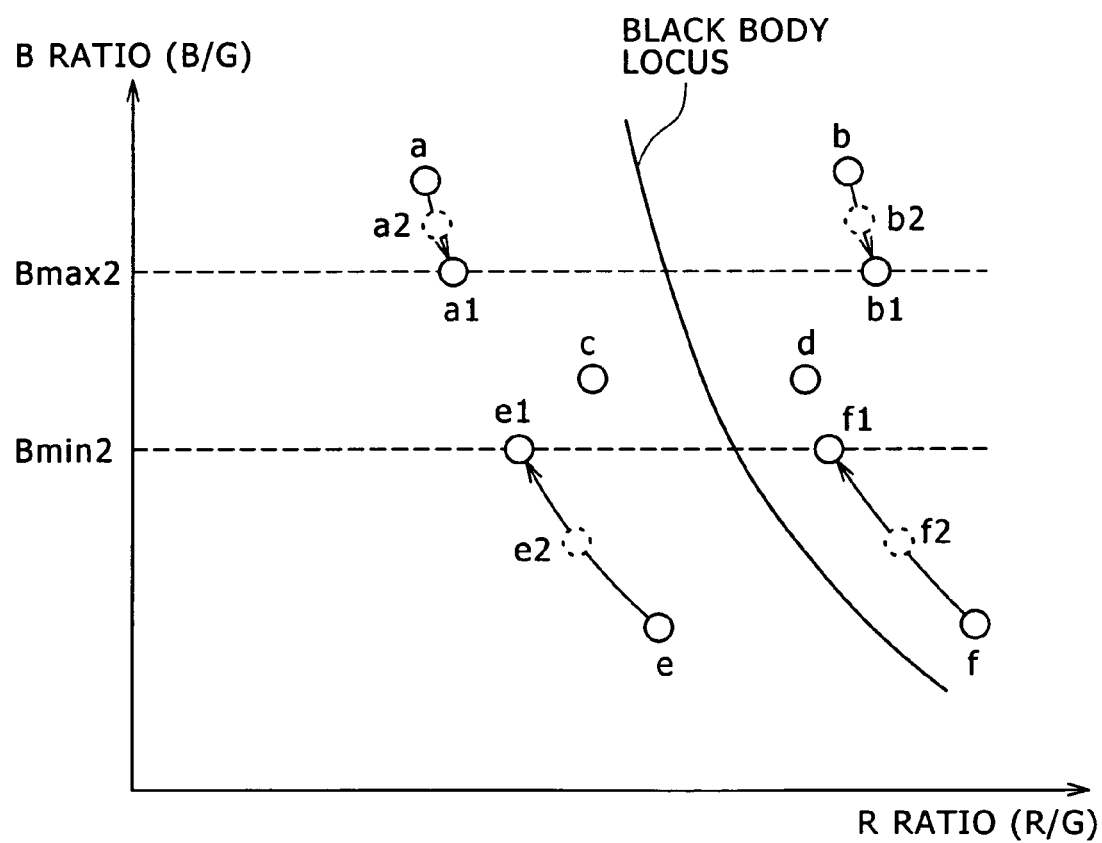
FIG. 4 is a diagram illustrating a relationship between the gain value and the black body locus of a B amplifier and a G amplifier shown in FIG. 2.

FIG. 4 illustrates a relationship between the gain values of the B amplifier and the G amplifier and the black body locus. The gain setting upon setting of the follow-up sensitivity of the B ratio is further described with reference to FIG. 4.

Points a to f in FIG. 4 indicate plotted points on a chromaticity coordinate system of the R ratio and the B ratio adjusted so as to reproduce correct white by means of the AWB function. Where the follow-up sensitivity is 1, the points a to f do not move and the R ratio and the B ratio at the point of time are outputted as they are, whereupon reciprocal numbers to them are set as gains to the white balance amplifier 141. However, though not shown, the output value of the B ratio is limited with the lower limit value Bmin1 and the upper limit value Bmax1 as described hereinabove with reference to FIG. 3.

On the other hand, if the range (follow-up range) of the B ratio which follows up fully so as to reproduce correct white is set as indicated by broken lines, then where the follow-up sensitivity is 0, if the B ratio is within the follow-up range like the points c and d, then the R ratio and the B ratio are outputted as they are. However, if the B ratio is higher than the follow-up range like the points a and b, then the points are parallelly moved along the black body locus until they are limited to the upper limit value Bmax2. On the other hand, if the B ratio is lower than the follow-up range like the points e and f, then the points are parallelly moved along the black body locus until they are limited to the lower limit value Bmin2.

Where the follow-up range is set to values between zero and one, the points a, b, e and f which are outside the follow-up range are moved along the black body locus by an amount which varies so as to increase in inverse proportion to the follow-up sensitivity. For example, if the follow-up sensitivity is the middle value of 0.5, then the points a, b, e and f are moved to intermediate points of the loci of movement in the case wherein the follow-up sensitivity is zero like points a2, b2, e2 and f2. The amount of the movement increases as the follow-up sensitivity drops.

In the example of FIG. 4, a gain value is moved parallelly along the black body locus so that an image of a natural color having a tinge of the light source upon image pickup may be obtained. For example, where the B ratio is higher than the follow-up range, that is, when a gain value with which the B signal is amplified to a higher level is obtained, if only the gain value of the B amplifier is limited, then a yellow image on which only the level of the B signal decreases is obtained while an actual light source color is in an orange color direction along the black body locus. Therefore, if also the gain value for the R amplifier is adjusted, an image which keeps a tinge of the light source is obtained. For example, when an image is picked up under the setting sun or the like, the image keeps a tinge of the light source. On the other hand, when the B ratio is lower than the follow-up range, if only the gain value of the B amplifier is limited, then a blue image is obtained. However, if also the gain value of the R amplifier is adjusted, then an image which keeps a tinge of cyan (cold color) of the light source is obtained. For example, when an image is picked up under a cloudy sky or the like, the image can keep a tinge of the light source.

Then, the adjustment amount of the gain value (amount of movement) is adjusted in response to the follow-up sensitivity. As hereinafter described, as the follow-up sensitivity is set in response to an estimated illuminance level of an image signal, it is possible to produce a picture of a natural color which has an appearance nearer to an appearance of an image pickup scene to an observer.

It is to be noted that, while, in FIG. 4, the gain value where the B ratio is limited is illustrated, alternatively the R ratio may be limited similarly or both of the B ratio and the R ratio may be limited. Further, the gain value may be moved not only in a direction parallel to the black body locus but also in a direction perpendicular to the black body locus. In this instance, the amount of movement in the perpendicular direction is smaller than that in the parallel direction. Further, the locus to be used as a reference in movement may not be the black body locus but, for example, a locus by the color temperature variation of the daylight.

Further, not only control values based on estimation of an image pickup light source such as an amplifier gain but also limit values corresponding to such lower limit values Bmin1 and Bmin2 and upper limit values Bmax1 and Bmax2 are provided, for example, in response to an estimated parameter of the image pickup light source to perform modulation. In this instance, the parameter of the light source may be any parameter only if it has a relationship in magnitude same that of the color temperature.

Further, not only a control value for the chromaticity according to RGB but also a control value on a coordinate system of the chromaticity (x-y chromaticity coordinate system) which can be determined uniquely by conversion, for example, from the CIE standard relative luminous efficiency, and the control value may be modulated. Further, not such a two-dimensional chromaticity coordinate system as an R ratio-B ratio coordinate system but a one-dimensional chromaticity may be used to perform modulation of the control value.

Figure 5A:
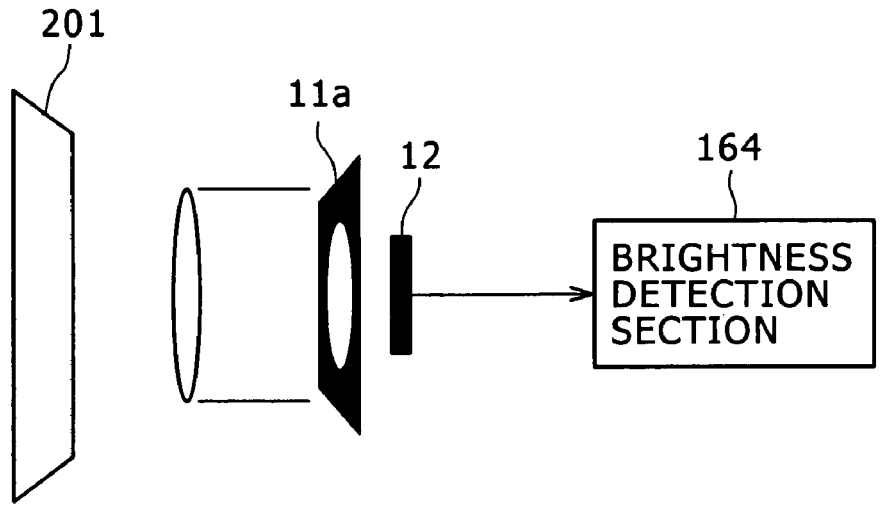
FIGS. 5A and 5B are schematic views illustrating brightness detection and control states of an iris and an electronic shutter of the digital still camera of FIG. 1.
Figure 5B:
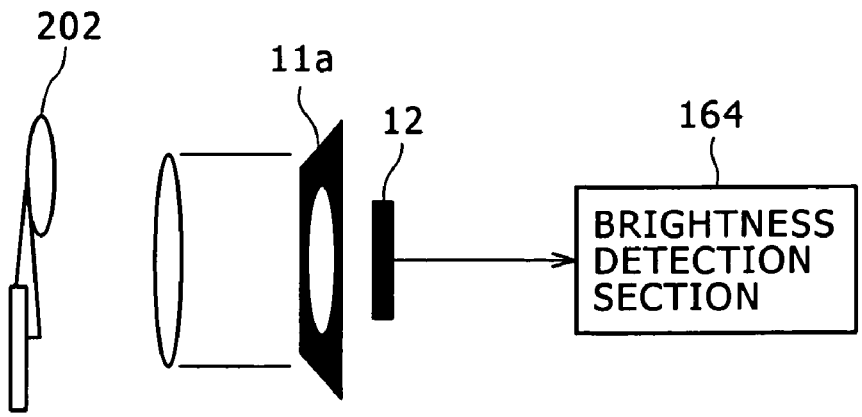

FIGS. 5A and 5B illustrate brightness detection and control states of the iris and the electronic shutter. A method of calculating the estimated illuminance level is described with reference to FIGS. 5A and 5B.

Thought not shown in FIGS. 5A and 5B, the brightness detection section 164 detects the brightness of an image from RGB signals after white balance adjustment by the white balance amplifier 141. The brightness detection section 164 uses maximum values of RGB values of each of pixels of the image and averages the maximum values over the entire screen to detect the brightness of the image. This is because, if it is assumed that, where the reflectivity of the luminance of the subject is low, the subject has some saturation, a maximum value of three RGB values exhibits a level which is nearer to a luminance level of reflected light from a wide surface than a product sum of the RGB values and is nearer to the level which varies in response to the illuminance.

The exposure light amount setting section 163 estimates an illuminance level at present based on the control values for the iris 11a and the electronic shutter and the detection value of the brightness. First, as shown in FIG. 5A, prior to the estimation (for example, before shipment), an image of a reference chart 201 of an achromatic color whose reflectivity in luminance is fixed (approximately 20% to 100%) is picked up in a state of an illuminance of 100 [Lux] under a light source whose spectral distribution is nearly flat as a reference state, and the control values for the iris 11a and the electronic shutter and the detection value of the brightness then are recorded.

Upon actual image pickup, as shown in FIG. 5B, the control values for the iris 11a and the electronic shutter and the detection value of the brightness when an image of a subject 202 is to be picked up are acquired, and differences between the acquired values and corresponding values in the reference state are converted into EV values and all added. For example, where the control value of the iris 11a in the reference states and the state at present is F2.0 and F4.0 as seen in FIGS. 5A and 5B, respectively, the conversion value is −2.0 EV. Further, when the speed of the electronic shutter is 1/60 second and 1/120 second, the conversion value is −1.0 EV, and when the detection value of the brightness is 100 and 50, the conversion value is −1.0 EV and the addition value is −4.0 EV. It is to be noted that, if a process (AGC or the like) for amplifying RGB values of a picked up image with a common gain to control the brightness is applied, then it is necessary to convert also the difference between values of the gain in the reference state and the state at present into an EV value and add the AV value.

Further, conversion not into a relative level to that in the reference state but into a level corresponding to an absolute illuminance is performed, for example, by calculation of $1,000 \times 2^{EV}$ [Lux]. It is to be noted here that the output value as the estimated illuminance level is a logarithm to the base 2 (hereinafter referred to as LV value). This value increases in proportion to the EV value.

It is to be noted that a temporal low-pass filter may be provided at the output stage of the estimated illuminance level of the exposure light amount setting section 163 to stabilize the modulation amount of the amplifier gain setting section 161.

Figure 6:
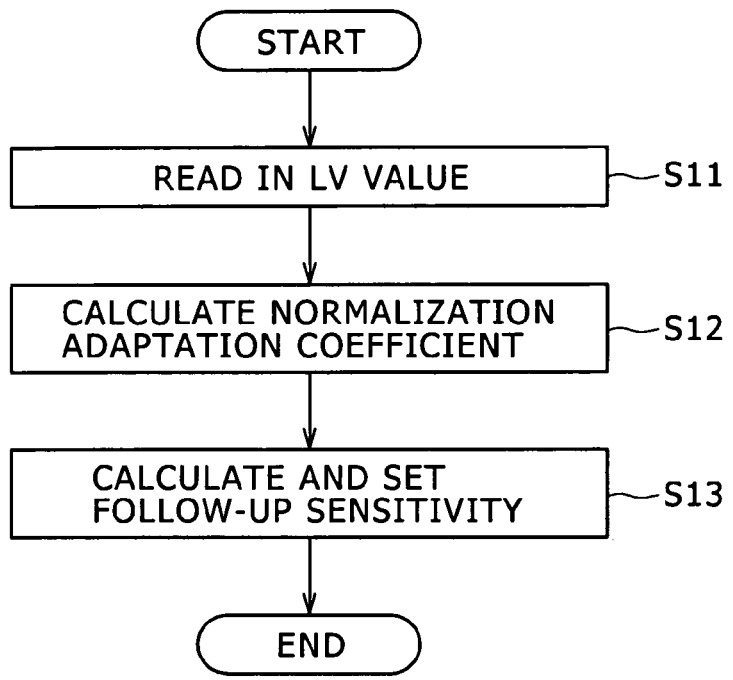
FIG. 6 is a flow chart illustrating a processing procedure of a follow-up sensitivity setting section shown in FIG. 2.

FIG. 6 illustrates a processing procedure by the follow-up sensitivity setting section 162.

Step S11: the follow-up sensitivity setting section 162 reads in an estimated illuminance level (LV value) from the exposure light amount setting section 163.

Step S12: The amplifier gain setting section 161 calculates a normalization adaptation coefficient Dnorm from the LV value. The normalization adaptation coefficient Dnorm exhibits such an adaptation state that, when it has a maximum value of 1.0, the image pickup light source is fully adapted to reproduce white correctly, but exhibits such an adaptation state that, when it has a minimum value of 0, white is reproduced while a tinge of the light source is left most among all illuminance levels. The normalization adaptation coefficient Dnorm basically exhibits a higher value as the LV value exhibits a higher value, and if the corresponding relationship is based on a model expression of the visual sense system, an experiment result or the like, then an adaptation state of an observer can be estimated with a high degree of accuracy. An example of a graph for use with the conversion is hereinafter described with reference to FIG. 7.

Step S13: The follow-up sensitivity setting section 162 calculates a follow-up sensitivity from the normalization adaptation coefficient Dnorm and sets the calculated follow-up sensitivity Dset to the amplifier gain setting section 161. The follow-up sensitivity Dset is calculated from the normalization adaptation coefficient Dnorm and a minimum sensitivity level Dmin (where 0≦Dmin≦1) set in advance in accordance with the following expression:

$$Dset=(1-Dmin)Dnorm+Dmin$$

Here, the degree to which a tinge of the image pickup light source is to be left in the white balance adjustment can be determined by setting of the minimum sensitivity level Dmin. In particular, as the minimum sensitivity level Dmin decreases, the range over which the degree to which a tinge is to be left is controlled increases and the degree to which a tinge is to be left can be increased. Therefore, a plurality of values may be set as the minimum sensitivity level Dmin such that one of them is selectively used in response to an image pickup situation.

For example, between still picture image pickup and moving picture image pickup, a property of a reproduction monitor used normally, a demanded follow-up degree and so forth are frequently different. Therefore, picture making may be distinguished intentionally such that, for example, upon moving picture image pickup, the minimum sensitivity level Dmin is set to a lower value to prevent the tinge from varying unnaturally when the light source varies during image pickup. Or, the minimum sensitivity level Dmin may be set by an operation of a user. For example, a plurality of operation modes corresponding to different image pickup intentions of a user are prepared in advance such that one of values of the minimum sensitivity level Dmin preset for the individual operation modes is set. At this time, for example, also limit values to a gain may be set for each of the operation modes.

Figure 7:
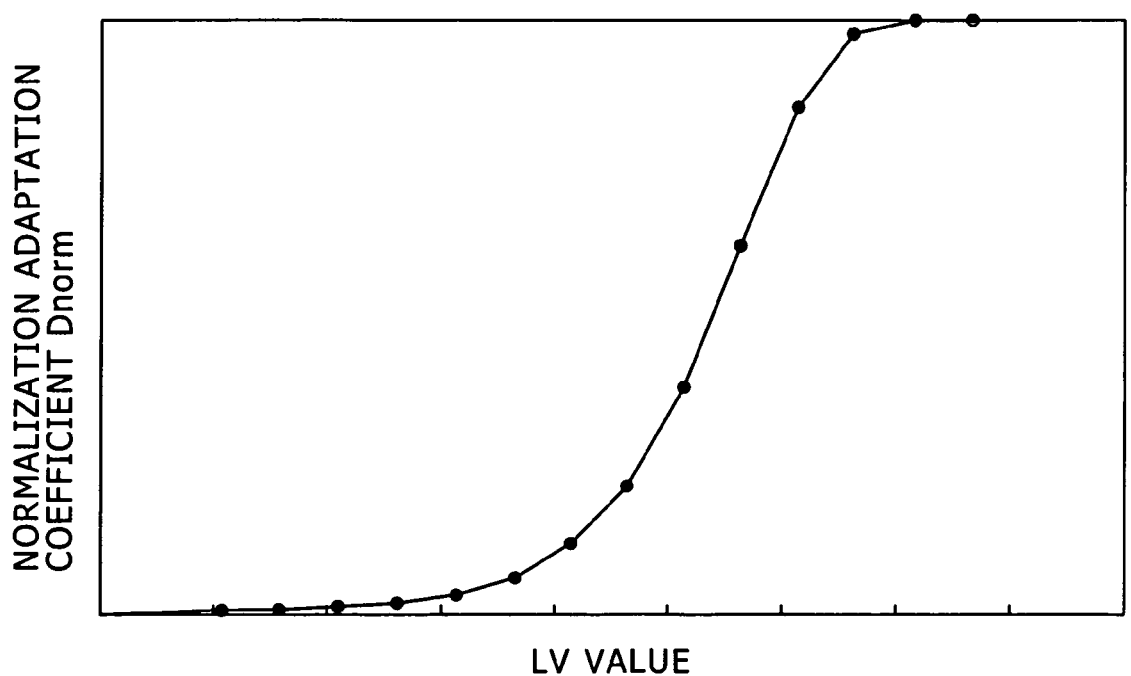
FIG. 7 is an exemplary graph used for calculation of a normalization adaptation coefficient in the processing procedure of FIG. 6.

FIG. 7 shows a graph to be utilized for calculation of the normalization adaptation coefficient Dnorm.

The follow-up sensitivity setting section 162 stores, for example, LV values at a small number of points in the graph of FIG. 7 and values of the normalization adaptation coefficient Dnorm in a coordinated relationship with each other in a ROM or the like thereof in advance. Then, at step S12, a normalization adaptation coefficient Dnorm corresponding to the LV value thus read in is calculated from a plurality of ones of the values stored in the ROM by interpolation such as linear interpolation. However, if the LV value is outside the set range, then where the LV value is lower than the lower limit, the minimum value of zero is outputted, but where the LV value is higher than the upper limit, the maximum value of one is outputted. Where a small number of relationships between the LV value and the normalization adaptation coefficient Dnorm are stored in advance in the ROM and used by interpolation in this manner, also a complicated result obtained from a non-linear model expression of the visual sense system or an experiment can be utilized simply for setting of the follow-up sensitivity.

As described above, in the digital still camera of the present embodiment, a follow-up sensitivity is set in response to a level corresponding to an illuminance of an image signal, and a degree with which the image signal is to be adjusted in a direction in which a correct color is reproduced correctly is varied in response to the follow-up sensitivity. In particular, as the illuminance level increases, the white balance correction is applied more strongly such that the color under an image pickup light source becomes a correct color, and as the illumination level decreases, the white balance correction is applied such that the color of the image may approach a color corresponding to a color under a particular light source from the correct color. Where the illuminance level is utilized, the adaptation state of the visual sense of the observer to the image pickup light source can be estimated with a high degree of accuracy, and the limitation and the correction amount upon gain setting of the white balance amplifier 141 are controlled in response to the adaptation state. Therefore, it is possible to automatically produce a natural picture image which has an appearance near to an appearance of an image pickup scene in an estimated adaptation state.

It is to be noted that the present invention can be applied not only to such a color reproduction correction process (white balance process) which is performed with reference to a white region of a picked up image as described above but also to a color reproduction correction process wherein linear conversion is performed based on more than six color reproduction coefficients as matrix coefficients in response to sensor response values having different spectral sensitivity characteristics of three channels or more to achieve such a color balance that a color same as that under an image pickup light source is reproduced. In this instance, a tinge under a light source different from the image pickup light source is reflected naturally on the image.

It is to be noted that, while, in the embodiment described above, the present invention is applied to a digital still camera, the present invention can be applied also to any other image pickup apparatus which uses a solid-state image pickup device such as a digital video camera. Further, the present invention can be applied to image pickup functions of a portable telephone set, a PDA (Personal Digital Assistant) and so forth. Further, the present invention can be applied also to processing of an image pickup signal by a small-size camera for a visual telephone to be connected to a PC or the like or for game software.

Further, the processing functions described above can be implemented by a computer. In this instance, a program which describes processing contents of those functions which the image pickup apparatus should have (particularly the functions corresponding to the amplifier gain setting section 161, follow-up sensitivity setting section 162, exposure light amount setting section 163, brightness detection section 164 and so forth) is provided. Then, the program is executed by a computer to implement the processing functions described above on the computer. The program which describes the processing contents can be recorded on or in a recording medium which can be read by a computer. A magnetic recording apparatus, an optical disk, a magneto-optical disk, a semiconductor memory and so forth are available as such computer-readable recording media.

In order to distribute the program, for example, portable recording media on or in which the program is recorded such as an optical disk or a semiconductor memory are sold. Also it is possible to store the program in a storage apparatus of a server computer such that the program can be transferred from the server computer to another computer through a network.

A computer which executes the program stores the program, for example, recorded on or in the portable recording medium or transferred from the server computer into a storage apparatus of the computer itself. Then, the computer reads the program from the storage apparatus of the computer itself and executes processes in accordance with the program. It is to be noted that the computer may otherwise read the program directly from the portable storage medium and execute processes in accordance with the program. Or, the computer may execute a process in accordance with a program every time it receives the program transferred from the server computer.

While a preferred embodiment of the present invention has been described using specific terms, such description is for illustrative purposes only, and it is to be understood that changes and variations may be made without departing from the spirit or scope of the following claims.

The invention claimed is:

1. An image pickup apparatus which includes a solid-state image pickup element for picking up an image, comprising:
    light source color estimation means for estimating a light source parameter which relies upon a spectral distribution of an image pickup light source based on an image signal obtained by the image pickup;
    illuminance level estimation means for estimating an illuminance level whose value relies upon an illuminance based on the image signal;
    control value modulation means for modulating a first adjustment control value for each color signal of the image signal when adjustment is to be performed so as to establish a white balance based on the estimated light source parameter in a direction toward a second adjustment control value for each of the color signals when adjustment is to be performed so that an achromatic subject under a particular reference light source is reproduced as an achromatic subject; and
    color signal adjustment means for adjusting each of the color signals of the image signal in response to the first adjustment control value output from the control value modulation means.

2. The image pickup apparatus according to claim 1, further comprising exposure control means for controlling light exposure upon image pickup based on a brightness of the image, the illuminance level estimation means estimating the illuminance level based on the image signal and an exposure control parameter of the exposure control means.

3. An image pickup apparatus which includes a solid-state image pickup element for picking up an image, comprising:
    light source color estimation means for estimating a light source parameter which relies upon a spectral distribution of an image pickup light source based on an image signal obtained by the image pickup;
    illuminance level estimation means for estimating an illuminance level whose value relies upon an illuminance based on the image signal;
    control value modulation means for modulating a first adjustment control value when each color signal of the image signal is to be adjusted based on the estimated light source parameter so that a color of a subject observed under an image pickup light source is reproduced in a direction toward a second adjustment control value to be used when each of the color signals is to be adjusted so as to reproduce a color when the same subject is observed under a particular reference light source; and
    modulation control means for varying an amount of modulation of the first adjustment control value in response to the illuminance level.

4. An image pickup apparatus which includes a solid-state image pickup element for picking up an image, comprising:
    a light source color estimation section operable to estimate a light source parameter which relies upon a spectral distribution of an image pickup light source based on an image signal obtained by the image pickup;
    an illuminance level estimation section operable to estimate an illuminance level whose value relies upon an illuminance based on the image signal;
    a control value modulation section operable to modulate a first adjustment control value for each color signal of the image signal when adjustment is to be performed so as to establish a white balance based on the estimated light source parameter in a direction toward a second adjustment control value for each of the color signals when adjustment is to be performed so that an achromatic subject under a particular reference light source is reproduced as an achromatic subject; and
    a color signal adjustment section operable to adjust each of the color signals of the image signal in response to the first adjustment control value output from the control value modulation section.

5. An image pickup apparatus which includes a solid-state image pickup element for picking up an image, comprising:
    a light source color estimation section operable to estimate a light source parameter which relies upon a spectral distribution of an image pickup light source based on an image signal obtained by the image pickup;

an illuminance level estimation section operable to estimate an illuminance level whose value relies upon an illuminance based on the image signal;

a control value modulation section operable to modulate a first adjustment control value when each color signal of the image signal is to be adjusted based on the estimated light source parameter so that a color of a subject observed under an image pickup light source is reproduced in a direction toward a second adjustment control value to be used when each of the color signals is to be adjusted so as to reproduce a color when the same subject is observed under a particular reference light source; and a modulation control section operable to vary an amount of modulation of the first adjustment control value in response to the illuminance level.

* * * * *